[72] Inventors George William Taylor
Princeton;
Arthur Miller, Princeton Junction, both of N.J.
[21] Appl. No. 31,601
[22] Filed Apr. 24, 1970
[45] Patented Nov. 30, 1971
[73] Assignee RCA Corporation

[54] ELECTRO-OPTICAL SYSTEM
12 Claims, 25 Drawing Figs.

[52] U.S. Cl. ................ 350/150, 350/149, 350/151, 350/160, 350/DIG. 2
[51] Int. Cl. ................ G02f 1/26
[50] Field of Search ................ 350/149–151, 157, 160, 161, DIG. 2; 340/174.1, 173.2

[56] References Cited
UNITED STATES PATENTS

| | | | |
|---|---|---|---|
| 2,780,958 | 2/1957 | Wiley | 350/150 |
| 3,512,864 | 5/1970 | Haertling et al. | 350/150 |
| 3,164,816 | 1/1965 | Chang et al. | 350/151 UX |
| 3,516,080 | 6/1970 | Smith | 350/151 X |
| 3,555,556 | 1/1971 | Nacci | 350/151 |
| 3,391,972 | 7/1968 | Harris et al. | 350/150 |
| 3,290,619 | 12/1966 | Geusic et al. | 350/150 |

FOREIGN PATENTS

| | | | |
|---|---|---|---|
| 1,120,093 | 7/1968 | Great Britain | 350/150 |

OTHER REFERENCES

Fushimi et al., "Optical Study of Lead Zirconate-Titanate" J. Phys. Soc. Jap. Vol. 20, No. 11 (Nov. 1965) pp. 2007– 2012

*Primary Examiner*—David Schonberg
*Assistant Examiner*—Paul R. Miller
*Attorney*—H. Christoffersen

ABSTRACT: The sharp change in optical properties of ferroelectric and other materials at or near their transition temperature (in the case of ferroelectric material, this may be their ferroelectric—paraelectric transition temperature, Curie point) is made use of in light deflectors, light valves and the like. The material is heat biased as, for example, by the application of an alternating voltage of an amplitude sufficient to produce the TANDEL or an analogous effect, to a value close to its transition-temperature. An electrical pulse may then be applied to the material for causing sufficient additional heating to raise the temperature of the material to a different value such as one above the transition temperature. The change in optical properties which results may be employed to deflect or otherwise affect a beam of light applied to the material.

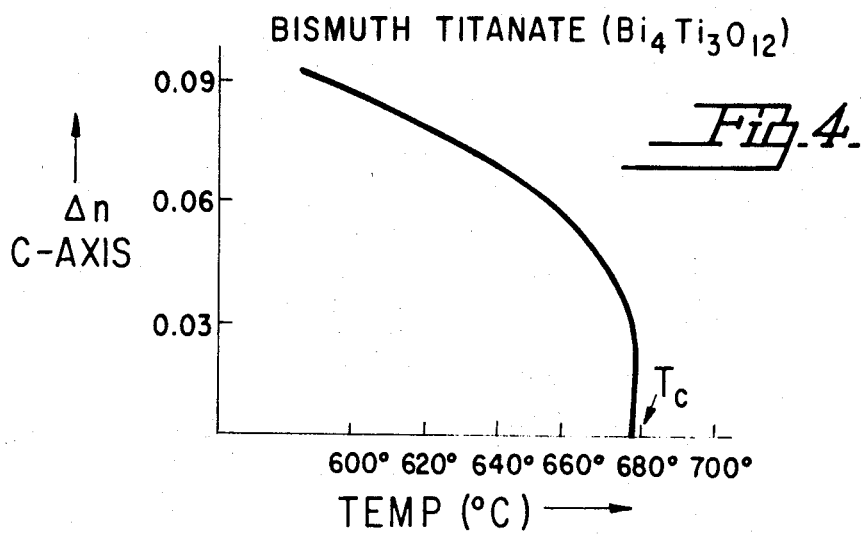
Fig. 4. BISMUTH TITANATE ($Bi_4Ti_3O_{12}$)
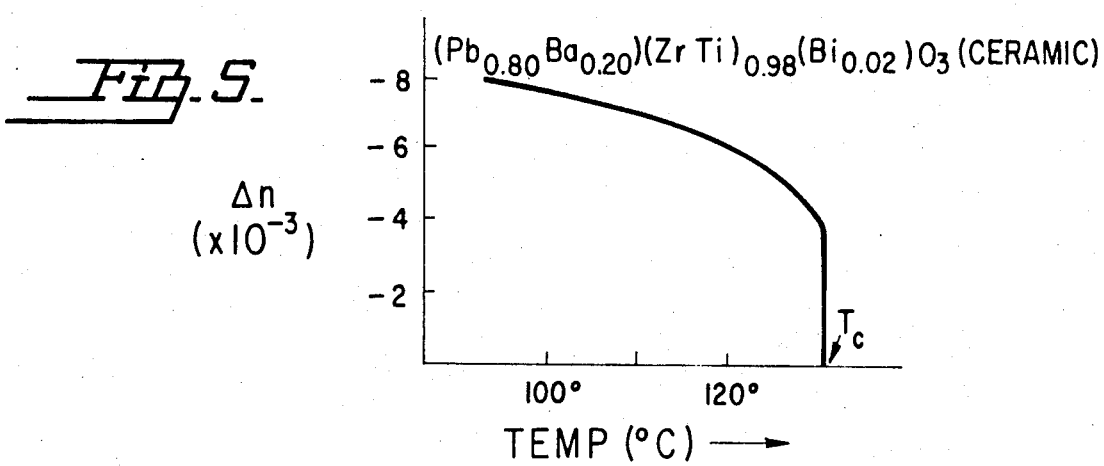
Fig. 5. $(Pb_{0.80}Ba_{0.20})(ZrTi)_{0.98}(Bi_{0.02})O_3$ (CERAMIC)
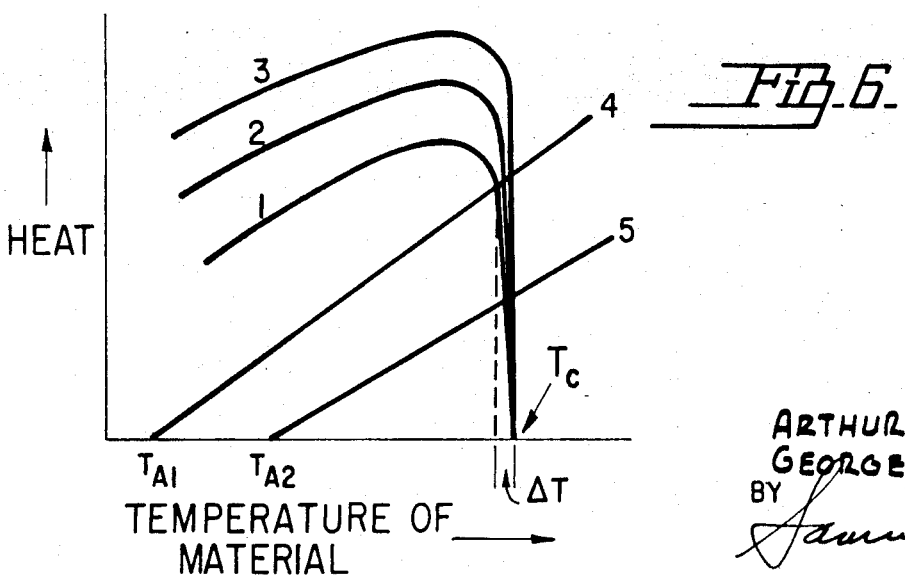
Fig. 6.

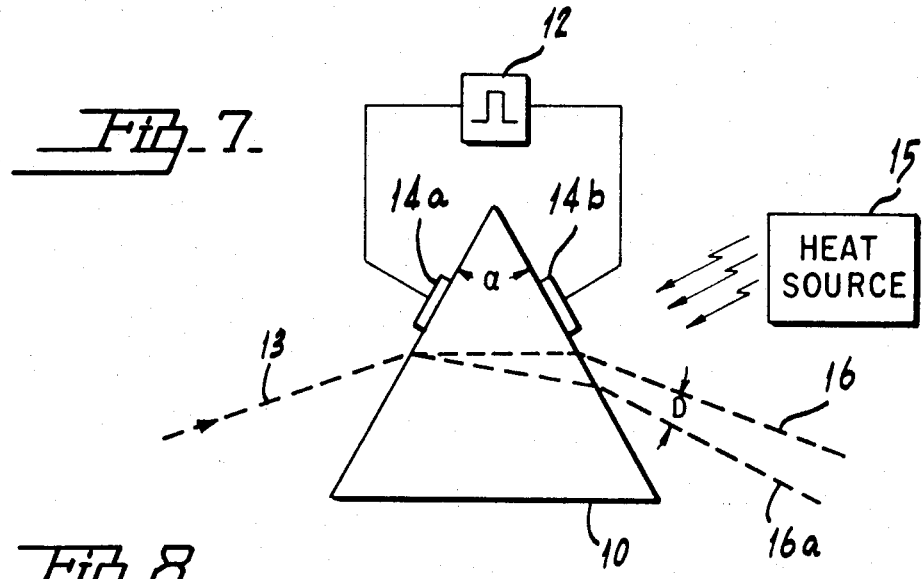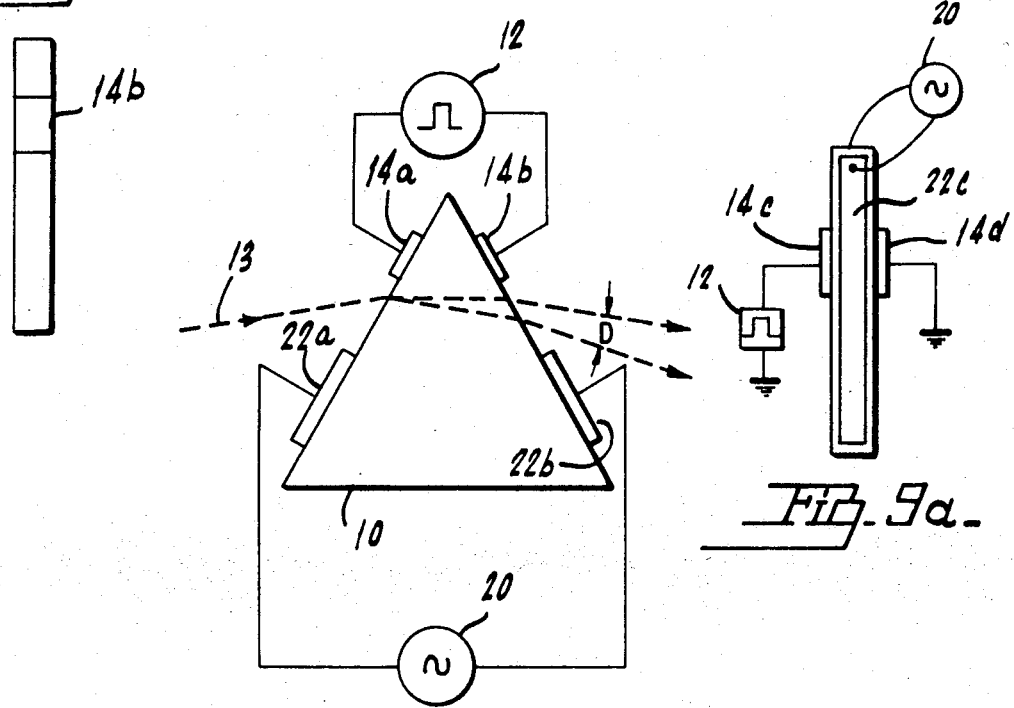

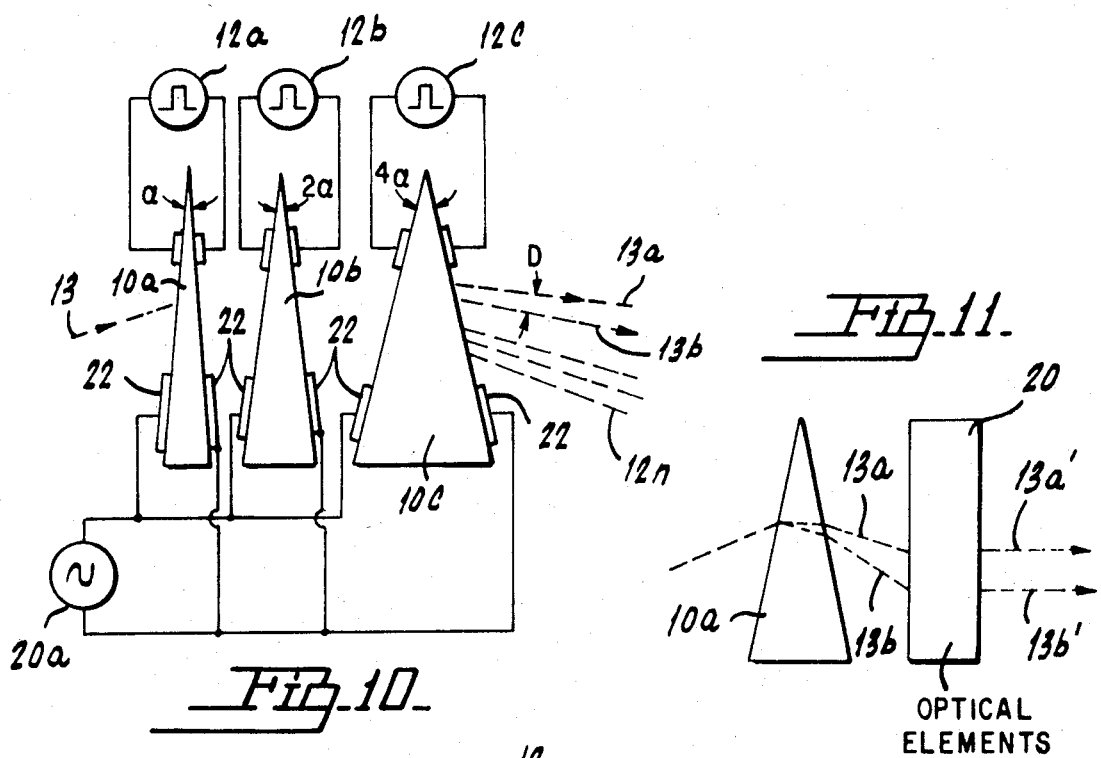
Fig. 10.
Fig. 11.
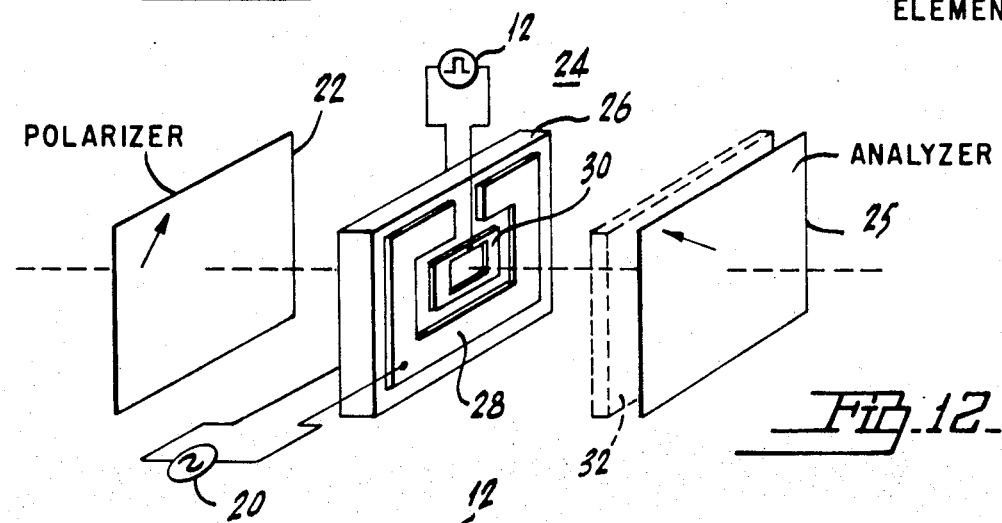
Fig. 12.
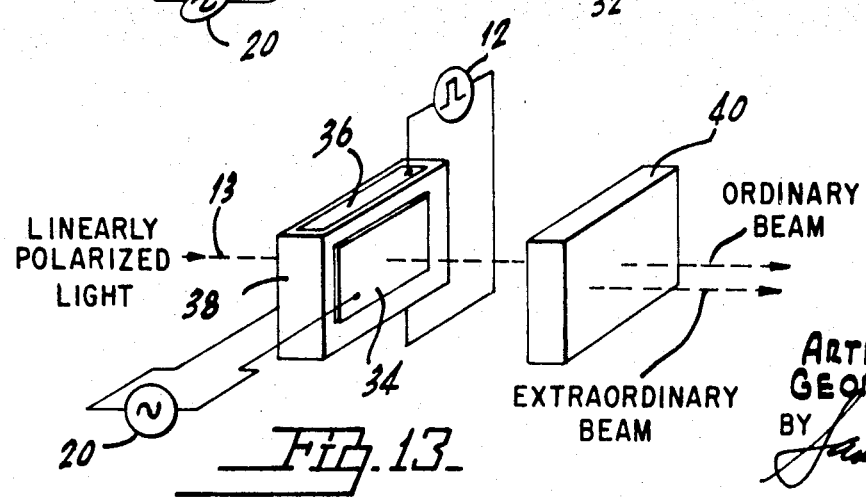
Fig. 13.

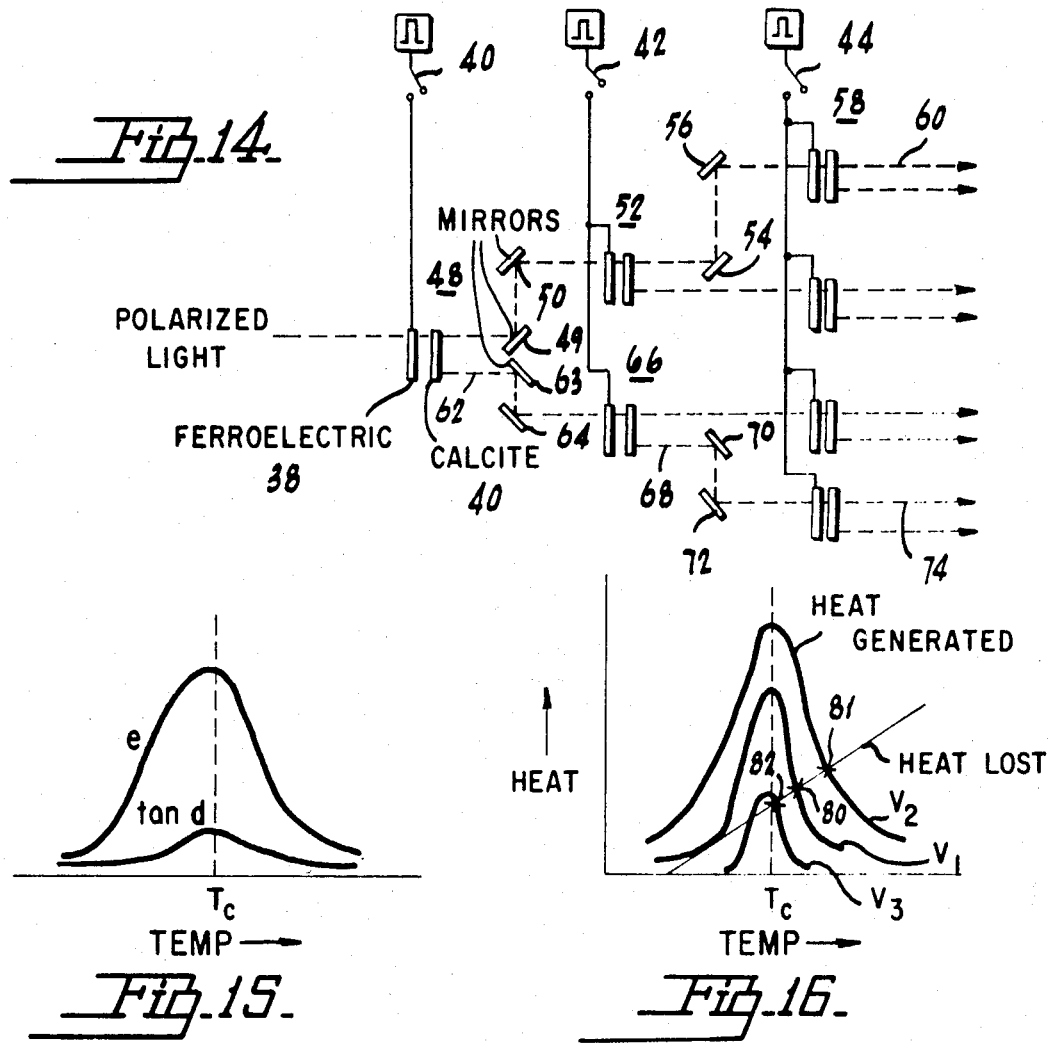
Fig. 14.
Fig. 15.
Fig. 16.
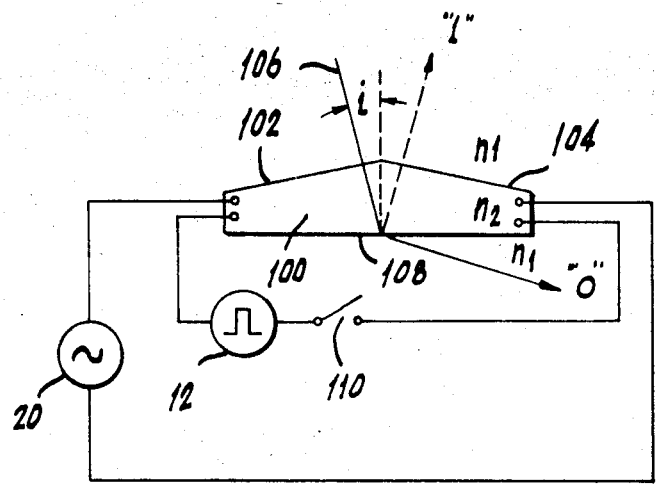
Fig. 17
INVENTORS
ARTHUR MILLER &
GEORGE W. TAYLOR
BY
Attorney

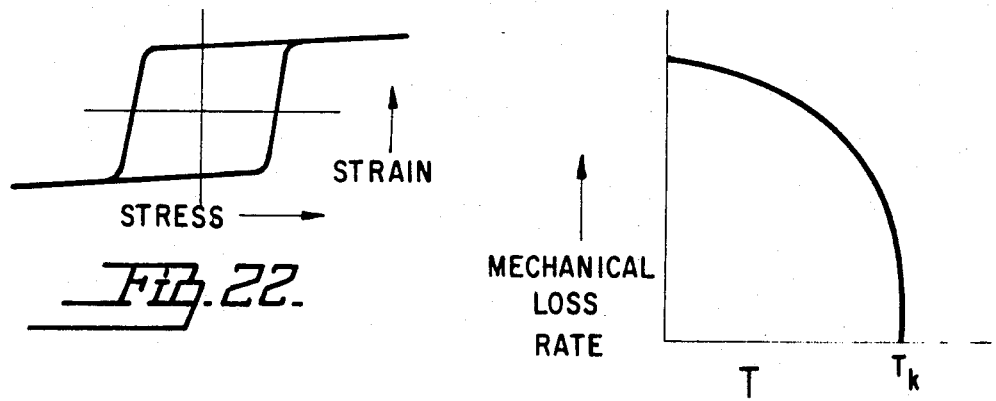
Fig. 22.
Fig. 23.
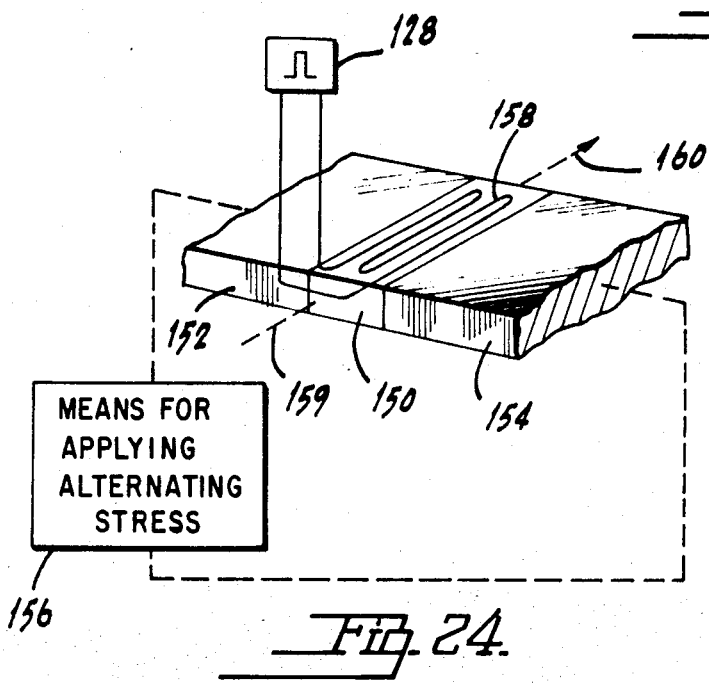
Fig. 24.

ELECTRO-OPTICAL SYSTEM

BACKGROUND OF THE INVENTION

There is a need in, for example, the data processing field, for fast, efficient light deflectors, light valves and the like. The object of this invention is to provide new and improved systems for meeting this need.

SUMMARY OF THE INVENTION

A system embodying the present invention includes a material whose optical properties change sharply in a small temperature range. The material is heat biased to a temperature in or close to this range and a beam of light is directed at the material. In response to a signal applied to the material, its temperature is changed through a relatively small range such as from a value on one side to a value on the other side of a certain critical temperature and the change in optical properties of the material which results sharply changes a characteristic such as deflection angle, polarization direction or other parameter of the light beam.

BRIEF DESCRIPTION OF THE DRAWINGS

FIG. 4 is a graph showing the change in birefringence of a single crystal of bismuth titanate, as a function of temperature;

FIG. 5 is a plot of the same characteristics of another material, this one a member of the family of ceramics popularly known as PZT;

FIG. 6 is a graph showing transferred heat versus temperature for a TANDEL stabilized ferroelectric material;

FIG. 7 is a schematic showing of a general form of light deflector embodying the present invention;

FIG. 8 is a side view of the deflector element of FIG. 7;

FIG. 9 is a schematic showing another form of deflector embodying the invention;

FIG. 9a is a side view of a modified form of the arrangement of FIG. 9;

FIG. 10 is a schematic showing a deflector arrangement embodying the present invention in which the light beam may be deflected to one of eight different positions;

FIG. 11 shows, in part, a modification of the system of FIG. 10;

FIG. 12 is a perspective, schematic showing a form of the invention suitable as a light valve;

FIG. 13 is a perspective, schematic, showing another form of light deflector embodying the invention;

FIG. 14 is a schematic showing a multiple position light deflector employing the plurality of arrangements such as shown in FIG. 13;

FIG. 15 is a graph plotting the temperature dependence of the dielectric constant $e$ and the loss angle $d$ for a dielectric material heated by the application of an alternating voltage of an amplitude insufficient to cause the TANDEL effect;

FIG. 16 is a graph of the temperature dependence on the amplitude of the driving voltage for a material heated in the way illustrated in FIG. 15;

FIG. 17 is a schematic drawing of an embodiment of the invention in which a beam of light is either reflected or refracted from a body of ferroelectric material;

FIGS. 22 and 23 are graphs to help explain the operation of the embodiment of the invention shown in FIG. 24; and FIG. 24 is a schematic diagram of a form of the invention employing a strain stabilized device.

DETAILED DESCRIPTION

Ferroelectric materials often show very large and abrupt changes in their optical parameters at their ferroelectric—paraelectric transition temperature, that is, at their Curie point. By way of example, five such materials are considered below in connection with FIGS. 1 through 5 which illustrate certain optical properties of these materials.

Figure 1:
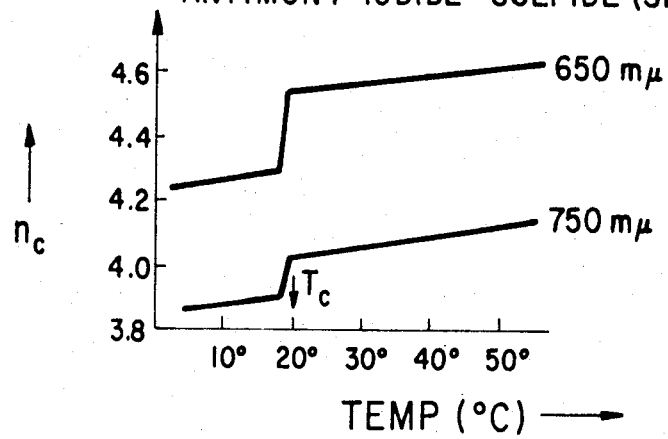
FIG. 1 is a graph of the index of refraction versus temperature for a crystal of antimony iodide sulfide.

FIG. 1 shows the change in index of refraction of a relatively recently reported material, antimony iodide sulfide (SbSI), as a function of temperature. The characteristics of the material at two different wavelengths of light are shown. In both cases there is a relatively large change in index of refraction Nc when the material is heated from a temperature slightly below the Curie temperature $T_C$ to a value slightly above the Curie temperature.

Figure 2:
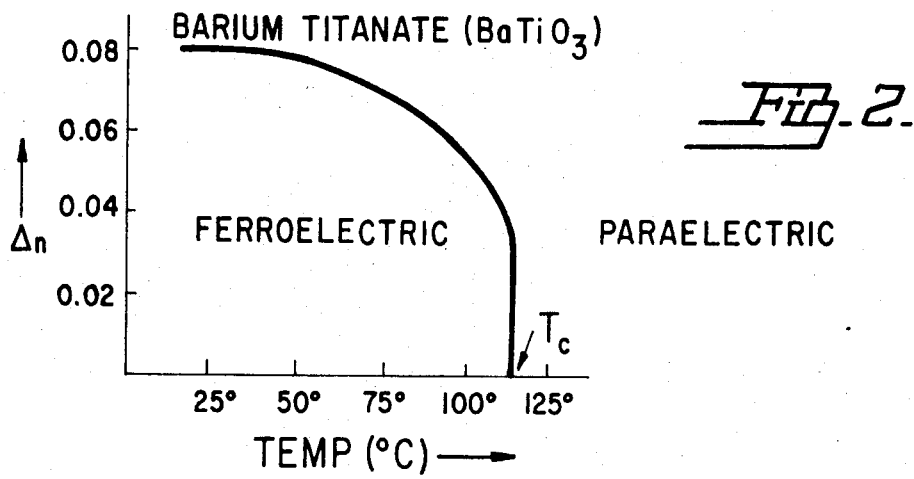
FIG. 2 is a graph showing the change in birefringence in a single crystal of barium titanate, as a function of temperature.

FIGS. 2, 4, and 5 illustrate the change in birefringence as a function of temperature for three different ferroelectric materials. In each case, only a single wavelength of light is shown. The curves are similar for other wavelengths although the amount of change in the birefringence $\Delta n$ (and index of refraction $n$) may vary from one wavelength to another. For materials such as these, an incident ray of light having a component in an appropriate polarization direction is resolved into two orthogonally related components which travel at different velocities through the material. The amount of this difference is dependent on $\Delta n = n_1 - n_2$, where $n_1$ and $n_2$ are the values of the index of refraction of the material as "seen" by these two different components.

As is apparent from all three FIGS. 2, 4, and 5, when the temperature of the material is changed from a value below the critical temperature to a value above the critical temperature the value of $\Delta n$ changes very sharply.

Figure 3:
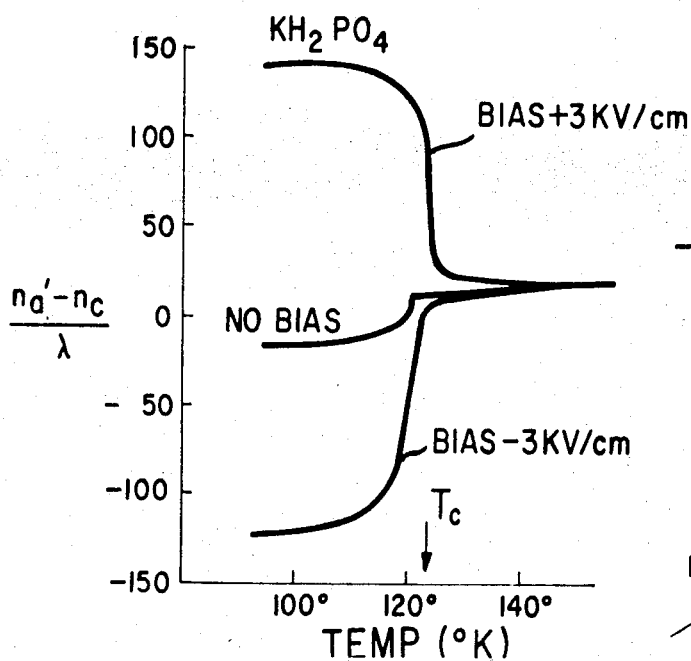
FIG. 3 is a graph showing optical properties of a third material, namely a single crystal of $KH_2PO_4$, known popularly as KDP.

FIG. 3 illustrates the same phenomenon as FIGS. 2, 4, and 5, however here the ordinate takes into account the wavelength of the light being applied to the KDP. This graph also shows that the change in index of refraction is greatly accentuated in KDP in the presence of an applied electric field.

As already mentioned in the introductory portion of the present application, in the present invention the sharp change in the optical parameters at the Curie point is made use of in light deflectors, light valves and the like. One way in which this may be accomplished is to employ the TANDEL effect discussed in greater detail later and described also in the volume FERROELECTRICITY, by Fatuzzo and Merz, John Wiley & Sons, 1967, page 269 and the references cited therein. This effect may be employed accurately to stabilize the temperature of the material when in its ferroelectric phase to a value just below its Curie point. For purposes of the present application, this may be considered to be the "off" state. The material momentarily may be heated to a value above its Curie point, placing the material in its paraelectric phase, by the application thereto of a fast (short duration) electrical pulse. This may be considered the "on" state of the material.

The effect of operating in the way described above is to induce a change in birefringence or refractive index which is three or four orders of magnitude greater than that which can be obtained with classical electro-optical materials operated in their paraelectric phase. Because the amount of heating needed to change state is small (typically 0.5° C. to 2° C.) and because it is done locally (the area need only be slightly greater than the light beam cross section), the electrical power needed is relatively small and the turn-on speed is relatively fast. Similarly, when employing the TANDEL effect, the turn off speed also is fast as the TANDEL effect pulls the material back very quickly to its ferroelectric phase for reasons discussed shortly.

TANDEL is an acronym for temperature autostabilizing nonlinear dielectric element. If a piece of ferroelectric material is switched back and forth between its polarization states, heat is generated due both to hysteresis loop losses and to normal dielectric losses. The amount of generated heat is a function of the frequency and the peak amplitude of the switching field. FIG. 6 shows the temperature dependence of the generated heat for a low (curve 1) medium (curve 2) and high (curve 3) amplitude switching field. The significant feature of curves 1, 2 and 3 is the rapid fall off in the generated heat as the material approaches its Curie temperature ($T_C$). The reason for this is that hysteresis loop losses are proportional to the product of polarization and coercive field and both these quantities fall to zero at $T_C$. Any generated heat is transferred away from the material by conduction, convection and radiation. Curves 4 and 5 in FIG. 6 show the rate of heat transfer for two ambient temperature ($T_A$) conditions. Curve 4 is a lower and curve 5 a higher ambient temperature. Where curves 4 and 5 intersect with curves 1, 2 and 3 (i.e., the transferred heat equals the generated heat) a stable operating condition is achieved. The stability achieved is equivalent to that obtained with negative feedback in an amplifier.

As can be seen from FIG. 6, the intersection points all lie in a narrow temperature range, indicating that despite large changes in the generated losses and the ambient conditions, the material remains at a temperature just below its Curie point.

The TANDEL effect operates with all ferroelectric materials irrespective of whether they have a 1st or 2nd order phase transition. It has been demonstrated in TGS, TGSe, TGFB, $KH_2PO_4$, $BaTiO_3$ and some ferroelectric glassceramics. The temperature stability, defined as $\Delta T_M/\Delta T_A$ (where $\Delta T_M$ is the change in the temperature of the material produced by a change in the ambient temperature of $\Delta T_A$), has been found to lie in the range 0.01 to 0.1 for these materials. The best stability is obtained by using a high switching frequency—typically 100 kHz.

Because of its high degree of temperature stability at temperatures where the dielectric and piezoelectric coefficients are often abnormally high, the TANDEL effect has been advantageously used in dielectric and frequency amplifiers, mixers, modulators, megohmmeters and meters for measuring flow, pressure and pH. The TANDEL effect has also been utilized as a general purpose temperature controller and in this role has been used for a cholestric liquid crystal display system.

As noted earlier, in apparatus embodying the present invention the TANDEL effect may be used to maintain a ferroelectric device in its "off" state, i.e., just below the Curie temperature. The application of an electrical pulse causes a small amount of local heating. This heating is sufficient to drive the material quickly into its paraelectric phase with a resulting large change in the optical properties. The following calculations show the amount of pulse power typically needed to produce this phase transition.

Consider a typical light deflector or valve having a cross-sectional area of 0.01 cm.$^2$. The thickness (the light transmission dimension) will vary–0.005 cms. is an easily achievable value for a single crystal or a piece of ceramic. A thin film ferroelectric (formed by evaporation) or sputtering) may have a thickness as low as 0.0005 cms. The density and specific heat of ferroelectrics vary from material to material. Densities typically lie in the range 1.5 to 5 and specific heats near the Curie point in the range 0.05 to 0.20 cals/gm. To achieve the necessary transition, anywhere from 0.5° C. to 2° C. rise in temperature is required, depending on the material used.

These figures allow a best and worst case calculation to be made. In the best case (a thickness of 0.0005 cms., a density of 1.5, a specific heat of 0.05 cals/gm. and a temperature rise of 0.5° C.) $7.9 \times 10^{-7}$ joules of electrical energy must be supplied to turn the deflector or valve "on." In the worst case (a thickness of 0.005 cms., a density of 5, specific heat of 0.2 cals/gm. and a temperature rise of 2° C.) $4.2 \times 10^{-4}$ joules of energy must be supplied. If the switching is to be done in $10\mu$-secs, then the pulse must have a power in the range 0.08 to 40 watts. Such powers readily can be achieved with commercially available pulse generators.

FIG. 7 illustrates a light deflector operating on the principles discussed above. The system includes a prism shaped ferroelectric element 10 formed of a material which preferably exhibits a relatively large change in index of refraction at the Curie point. As one example, SbSI, whose properties are shown in FIG. 1, is especially suitable. A heat source, shown generally at 15 applies heat to the material for maintaining it at a temperature below but close to the Curie temperature. A preferred form of heat source is illustrated in the following figures, however, the source 15 may instead be an oven, a source of infrared radiation, or other means for stably maintaining the crystal at the desired temperature. The system also includes a pulse source 12 connected to a pair of electrodes 14a 14b secured to the surface of the prism. The prism 10 may be of cross section only slightly larger than that of the light beam and in side view may have the shape shown in FIG. 8.

In the operation of the system of FIG. 7, a beam of light, illustrated by dashed line 13, is directed at one face of the prism and is refracted in conventional manner by the prism. The emerging light beam is shown at 16, the amount of bending of the light being a function, of course, of the index of refraction of the ferroelectric material 10. As already mentioned, the heat source 15 maintains the material 10 at a temperature slightly below the Curie temperature.

In order to deflect the light beam from the position indicated at 16 to a new position 16a, a short duration pulse is applied by source 12 to the electrodes 14a, 14b. The effect of the pulse is momentarily to heat a portion of the crystal, including at least the region through which the light beam is passing, to a value above the Curie point. The result is a sharp change in the index of refraction of the material 10 in the region thereof which is heated and this results in the deflection of the light beam through an angle D. For a given material, the amount of beam deflection is a function of the angle $\alpha$ of the apex angle of the prism. It is possible with a single prism and using a material such as SbSI to obtain a deflection angle of up to several degrees.

In the arrangement of FIG. 9, the same principle of operation is involved as is discussed above in connection with FIG. 7. The means employed for heating is the TANDEL effect already described. An alternating voltage is applied by source 20 to the two electrodes 22a, 22b. The amplitude of the 22b. is sufficient to switch the polarization between its two states during each cycle, that is, it is of sufficient amplitude to cause the entire hysteresis loop of the material to be traversed. In addition, the frequency is such that the switching domains in the material can follow the driving field. As already mentioned, tests have shown that good temperature stability is obtained by using a reasonably high frequency such as 100 kilohertz for the source 20 although other frequencies may be used.

The operation of the system of FIG. 9 is similar to that of the FIG. 7 system. By means of the TANDEL effect, the temperature of the prism 10 is stabilized at a value close to but slightly below the Curie point. To obtain beam deflection through an angle D, the pulse source 12 applies a short duration pulse to the crystal for heating a portion thereof through which the beam passes to value greater than the Curie point.

It should be mentioned here that in the embodiments of the invention discussed above and in the others which follow, the electrode configurations illustrated are merely examples. There are many other possibilities which are suitable. As one example, the electrodes 14a, and 14b of FIGS. 7 and 9 may be transparent and the beam of light may be shined through these electrodes and through the ferroelectric material between them as in FIG. 13. As a second example the heating electrodes 22 may surround the signal electrodes 14 in a manner similar to that shown in FIG. 12. As a third example, either or both pairs of electrodes may be formed on the broad prism faces (those in the plane of the drawing in FIG. 9). This is illustrated schematically in FIG. 9a in which the signal electrodes 14c and 14d are on the parallel faces of the prism. In this embodiment the TANDEL electrodes are transparent and are on the angular sides of the prism, only one of these electrodes 22c being visible. Other possibilities are equally feasible and their use depends, in each case, upon the overall system requirements.

FIG. 10 illustrates a form of the invention in which the beam may be deflected to one of eight different positions. The system includes three prisms 10a, 10b and 10c, each with a different apex angle. For example, the crystals may have apex angles of $\alpha$, $2\alpha$, and $4\alpha$ respectively. All of the crystals are maintained at a temperature just below their Curie point by a source 20a which is connected in parallel to the various electrodes 22. There may also be applied to each crystal a signal pulse for heating the crystal above its Curie point. Three pulse sources 12a, 12b, and 12c are employed, each for a different crystal.

In the operation of the system of FIG. 10, in the absence of signals produced by any of the sources 12a, 12b or 12c, the light beam position at the output of the system may be as shown at 13a. If only the source 12a is activated, the beam is deflected through an angle D and emerges at 13b. If only source 12b is activated the beam is deflected through an angle 2D. It is clear that by activating the various combinations of sources 12a through 12c the beam can be deflected to any one of eight different positions.

It can be shown that for relatively small angles of deflection, the system of FIG. 10 is perfectly satisfactory. In the system of FIG. 10 with a relatively small angle prism chosen for 10a, the prism 10a is capable of introducing a deflection angle of perhaps 1° or so. It is also possible, however, to modify the system of FIG. 10 as shown in FIG. 11 by placing optical elements shown schematically by block 20 between each pair of prisms. The function of these optical elements is to change the divergent beams 13a, 13b to parallel beams 13a', 13b'. There are a number of ways that block 20 may be implemented known to those skilled in this art as, for example, by employing a plurality of properly oriented double refracting prisms.

The embodiment of the invention shown in FIG. 12 is suitable for use as a light valve. It includes, in the order named, a polarizer 22, a ferroelectric structure 24, and an analyzer 25. The ferroelectric structure includes a ferroelectric material 26, preferably of the type exhibiting a large change in birefringence at the Curie point as, for example, is illustrated in FIGS. 2-5. A pair of TANDEL heating electrodes are located on opposite broad faces of the crystal, one of these electrodes being visible at 28 in the figure. A pair of signal electrodes are located, one on each face of the crystal, and one such electrode is visible at 30 in FIG. 12. While not essential, in a preferred form of the invention a compensator, shown in phantom view at 32, is included in the system.

In the operation of the system of FIG. 12, the source 20 of an alternating voltage to the heating electrodes 28 of appropriate amplitude and frequency to produce the TANDEL effect, that is, to stabilize the temperature of the material 26 to a value close to and slightly less than the Curie temperature. The thickness of the compensator 32 in the direction of the light beam is such that its retardation, in combination with that of the material 26, is equal to an integral number of optical wavelengths. Under this condition, the polarization state of the light is unaltered upon passage through the combination consisting of the material 26 and the compensator 32, and can be extinguished by a suitably oriented analyzer 25. When a heating pulse is applied to electrode 30 by source 12, the crystal is heated to a temperature above its Curie point and the birefringence of the crystal is sharply changed. As a result, the combined retardation of elements 32 and 26 is other than an integral number of wavelengths. Consequently, the light emerging from element 26 is, in general, elliptically polarized, with a component of polarization parallel to the polarization direction of analyzer 25. Light therefore is transmitted through the device when the heating pulse is applied. In a preferred embodiment of the invention the thickness of element 26 along the light path is so chosen that when the heating pulse is applied, the combined retardation of elements 26 and 32 is an odd number of half wavelengths. In this case the light emergent from compensator 32 is polarized parallel to the polarization direction of analyzer 25, and there occurs maximum transmission through the latter.

The system of FIG. 13 which operates on principles similar to that of FIG. 12 shows how the birefringence properties of the ferroelectric material may be used as the basis for a light deflector. In this embodiment of the invention, the two heating electrodes, one of which is shown at 34, are formed of a transparent conductor. The two signal electrodes, one of which is shown at 36, are located on different faces of the ferroelectric material 38 than are the two heating electrodes. A calcite crystal 40 is located beyond the ferroelectric element in the path of the emerging light beam.

In the operation of the system of FIG. 13, the material 38 is stabilized by means of the TANDEL effect to a temperature below, but close to its Curie point. The thickness of the material is such that at this temperature its birefringent retardation is nearly an integral number of wavelengths and, when it is heated above its Curie point by application of a signal from source 12, its birefringent retardation is equal to an odd number of half wavelengths. In the absence of a signal, the linearly polarized beam 13 passes through the material 38 without change in angle of polarization. The calcite crystal 40 passes this beam without deflection. This beam is known as the "ordinary" beam and is so legended in FIG. 13.

In response to the application of a signal by source 12, the ferroelectric material 38 is momentarily heated to a temperature above its Curie point. This causes the linearly polarized light 13 to become polarized in a direction orthogonal to the initial polarization direction. As is well understood in the art, the calcite crystal 40 effectively deflects this light to the position legended "extraordinary" beam in FIG. 13.

FIG. 14 illustrates how the light deflector of FIG. 13 may be employed in a multiple position light beam deflector. Each stage of the system of FIG. 14 consists of a ferroelectric element such as 38 followed by a calcite crystal such as 40. Although not shown, it is to be understood that all stages are temperature stabilized by the TANDEL effect in the same manner as in FIG. 13. If a signal pulse is applied to a stage, it deflects the beam downward as shown in FIG. 14 and if that stage does not receive a signal pulse the beam remains undeflected.

In operation, assume that all of the switches 40, 42, and 44 are open. In this case, the beam of light travels through stage 48, is reflected from mirrors 49 and 50, passes through stage 52, is reflected from mirrors 54 and 56 and passes through stage 58 appearing as output beam 60. Suppose now that switches 40 and 42 are closed. Now the polarized light passes through stage 48 and appears as beam 62. It is reflected from mirrors 63 and 64 to stage 66. There, it is deflected to position 68 and reflected from mirrors 70 and 72. The output beam is then the one shown at 74.

In a number of the systems described above, one consideration in the choice of a particular ferroelectric material to be employed is the difference in optical characteristics produced in response to the change in temperature from a value on one side of the Curie point to a temperature on the other side of the Curie point. In a number of cases, the amount of the optical change is dependent significantly on the wavelength of the light used. For example, it may be observed in FIG. 1 that a decrease in wavelength from 750 to 650 m$\mu$ results in a doubling in the change in the refractive index at the transition temperature. Nevertheless, it is sometimes equally as important to employ light at a wavelength which is appropriate to the particular use as it is to obtain the maximum change in parameters. For example, from other work it has been determined that an optical memory based on the magnetic storage of holograms is best operated in the near infrared. Under such circumstances, SbSI is a preferred ferroelectric material to use for beam deflection in a setup such as illustrated in FIG. 9 because of its superior properties at these wavelengths.

In the discussion up to this point, the means for heat biasing the ferroelectric material has been described generally in FIG. 7 as a heat source of one of many different types and specifically in other of the figures as being based on the TANDEL effect. It is also possible, however, with some materials to achieve temperature stabilization by employing an alternating heating signal at an amplitude lower than that required to traverse the entire loop. The heating in this case is due mainly to conventional dielectric heating and is proportional to $$V^2 f e \tan d,$$

where
V is the voltage amplitude
f is the frequency
e is the dielectric constant and
d is the loss angle.

The temperature dependence of e and tan d typically have a form of the type shown in FIG. 15. The temperature dependence of the heat generated when operating in this mode, for a relatively small driving voltage $V_1$, takes the form of FIG. 16 with the stability point lying just above the Curie point. This is indicated by the intersection 80 of the "heat lost" curve with the "heat generated" curve. By increasing the amplitude of the driving voltage to $V_2$ or decreasing the driving voltage to an amplitude $V_3$ the position of the stability point and hence, of the temperature can be varied accordingly as indicated at 81 and 82, respectively. It is thus possible to utilize the large variation in the optical properties of a ferroelectric material which occur in the small temperature range near the Curie point.

Operating in the way implied in FIG. 16, unlike the previous arrangements, auxiliary heat is not needed to achieve optical switching and hence switching electrodes are not essential. The switching may be achieved instead by modulating the frequency or amplitude of the relatively low level alternating voltage applied to the heating electrodes. In other words, by, for example, reducing the amplitude of the dielectric heating voltage, the material can be cooled from a temperature higher than the Curie temperature to a temperature just above the Curie temperature with a corresponding abrupt change in optical characteristics. In this mode of operation, as with the TANDEL scheme, the quiescent operating point is very stable due to a negative feedback situation.

Separate figures are not included herein to illustrate the mode of operation described above. The reason is that the structure is very similar to that of the embodiments illustrated. Operation in this way may be achieved, for example, placing a signal source in series or in parallel with the heating source such as 20 of FIG. 13 and operating the heating source 20 to obtain dielectric heating.

In all of the systems described thus far, the ferroelectric material has been a solid material. However, the invention is equally operative with a liquid which exhibits ferroelectric properties such as a liquid crystal. This material is considered to be ferroelectric because it exhibits the following characteristics:

1. An order—disorder transition, that is, the crystal changes from an ordered phase (nematic) to a disordered phase (isotropic) at a particular temperature.
2. The transition is very sharp and generally can be considered to be a first order transition.
3. As in the case of solid ferroelectrics, there are large changes in the thermal, dielectric and optical properties at the transition.
4. Switching transients similar to those seen in solid ferroelectrics can be measured in the nematic phase. Also, low frequency hysteresis loops have been observed. Relaxation time of ions limit this frequency.

There are a number of important characteristics of liquid crystals which make them interesting for use in the systems described and illustrated here. For one, changes in birefringence of between 0.1 and 0.5 have been observed for liquid crystals at their transition temperature. This is large indeed and permits very large retardations to be imparted to the two components of light. Another interesting characteristic of liquid crystals is that the latent heat required for the phase transition from nematic to isotropic is relatively small. In addition, many of the liquid crystal materials have a transition temperature only a few degrees above room temperature. Thus, the thermal energy needed to produce the phase transition (which is supplied electrically) is quite modest.

Because the hysteresis loop for liquid crystals can only be traced at low frequencies and because the power dissipated in the liquid crystal during electric field switching in the nematic phase is often quite small, it is preferred to temperature stabilize the material below its nematic-isotropic transition temperature by the method discussed in connection with FIGS. 15 and 16, namely by dielectric heating rather than by the TANDEL effect. As an alternative, the liquid crystal material may be placed in intimate contact with a solid ferroelectric material whose Curie temperature closely matches the transition temperature of the liquid crystal material. Under such circumstances, the liquid crystal can be temperature stabilized just below its transition temperature by TANDEL stabilizing the temperature of the solid ferroelectric substrate.

An arrangement in which a liquid crystal is employed may be quite similar to that shown in FIG. 13. Here, the liquid crystal is in the position of element 38 and consists, for example, of a liquid crystal film. The electrodes 34 which may be formed of tin oxide, for example, are located on the inner surface of two glass plates and the electrodes 36 are not needed. These two glass plates (not shown in FIG. 13) enclose between them both the electrodes just described and the liquid crystal. Arrangements comparable to this may be employed for the other embodiments of the invention. This arrangement may be operated by employing a heating voltage of an amplitude and frequency to produce dielectric heating as discussed in connection with FIGS. 15 and 16. The signal source may be in series or parallel with the heat source for modulating the heat source voltage.

In an arrangement of the type just described operating on the TANDEL effect there would be, in addition to the structure mentioned, a slab of ferroelectric material having a Curie temperature close to the liquid crystal transition temperature and an additional set of electrodes as already described.

In the discussion up to this point, ferroelectric—paraelectric transitions of ferroelectric materials have been considered. In some materials there also exists ferroelectric—ferroelectric transitions at which large changes in optical parameters occur. An example of such a transition is the orthorhombic-tetragonal transition which occurs in barium titanate ($BaTiO_3$) at 4° C. Along the 001 axis the birefringence is finite in the orthorhombic phase and zero in the tetragonal phase. It is to be understood that the present invention is applicable also to these materials operated at or near the ferroelectric—ferroelectric transition temperature.

In the various embodiments of the invention already discussed which make use of the TANDEL effect to heat bias the material close to the material's transition temperature, a signal is employed to switch the material from the ferroelectric to the paraelectric phase or vice versa. While this is a preferred way of operating the system for most applications because it results in a very abrupt and relatively large change in optical properties of the material, it is to be understood that it is also possible to obtain a useful output from the system without going through the transition temperature. For example, as may be observed from FIG. 2 there is a large change in birefringence in an operating region just beneath the Curie temperature. It is possible to heat bias the material in or close to this region and by means of a signal to change the heat applied to the material so that operation on this relatively sharply sloping portion of the curve results without going through the transition temperature.

The various embodiments of the invention discussed up to this point involve only the transmission of light through a ferroelectric material. It is also possible to operate the invention in a reflecting mode. FIG. 17 illustrates an embodiment operating on this principle. It includes a body of ferroelectric material 100 two of the faces 102 and 104 of which meet at an obtuse angle. A beam of light 106 is applied to one of these faces such as 102, preferably at right angles to the face. This beam of light meets the opposite face 108 of the body at an angle other than 90°. The remaining portions of the system are similar to those already discussed and are identified by the same numerals. The switch 110 schematically represents the means for applying the signal pulse to the material.

In the operation of the system of FIG. 1—if sin $i \geq n_1/n_2$, then the light beam will be totally reflected as light beam "1," where $i$ is the angle between the light beam and the normal to the face 100. If sin $i$ is $<n_1/n_2$, then the light beam will be refracted through the crystal as light beam "0." $n_1$ may be the refractive index of air (assuming the ambient is air), that is, $n_1=1$. By choosing a suitable angle for $i$ and then varying $n_2$ so that is is either, (1) greater than or equal to 1/sin $i$ or (2) less than 1/sin $i$, it is possible to either reflect the light beam or to transmit it through the material 100.

By way of example, consider the data for SbSI at 650m$\mu$ in FIG. 1. At the transition temperature, $n_2$ changes from 4.25 to 4.55. Accordingly, with this material satisfactory operation is achieved if the angle $i$ is chosen to be 13°.

As already discussed, changes in $n_2$ can be obtained by heating the ferroelectric through its transition temperature with an applied electrical pulse. As in the previous arrangements, it is preferable to heat bias the material by means of a source such as 20 which may employ an alternating voltage of the proper characteristics to produce the TANDEL effect and to switch the material into its second state by applying a pulse from source 12.

In the discussion up to this point, all of the materials mentioned are ferroelectric materials. The invention is also operative with other types of material. For example, optical effects similar to those already discussed may be obtained with magnetic materials, an example of such material being transparent yttrium iron garnet, $Y_3Fe_5O_{12}$, commonly abbreviated "YIG."

Figure 18:
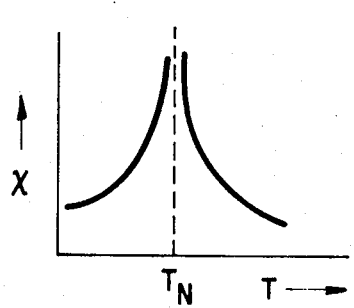
FIGS. 18 and 19 are graphs to help explain the operation of the embodiment of the invention shown in FIG. 20.

The dependence of the susceptibility $x$ versus temperature T in the vicinity of its critical temperature, the Neel temperature, $T_n$, for a material such as YIG is shown in FIG. 18. The Faraday effect, which is a rotation of the polarization direction of light directed parallel to a magnetic field, has a temperature dependence that is very nearly proportional to that shown in FIG. 18 for $x$. When a crystal of a material such as YIG is subjected to an alternating magnetic field of fixed amplitude and is situated between crossed polarizers, the direction of propagation of the light is parallel to the magnetic field and the intensity of the light passing through the device is modulated at twice the frequency of the applied field. The amplitude of the modulation has a temperature dependence nearly proportional to the square of the Faraday rotation, that is, to the square of the $x$ curve of FIG. 18. From observation, it can be seen that the amplitude is strongly temperature dependent in the vicinity of $T_n$.

Figure 19:
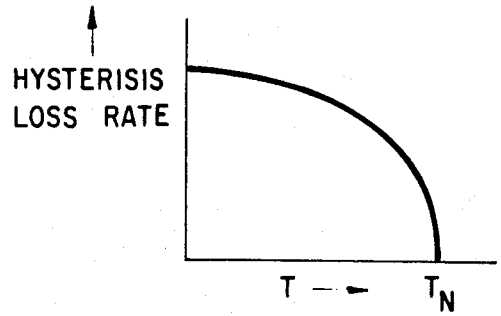

For constant amplitude of alternating magnetic field, the variation of hysteresis losses with temperature in a material such as YIG has the form shown in FIG. 19 in the vicinity of $T_n$. As with the ferroelectric devices previously described, it is therefore possible to stabilize a YIG crystal at a temperature close to $T_n$ by a magnetic analog of the TANDEL effect, that is, by the application of an alternating magnetic field of appropriate frequency and amplitude.

Figure 20:
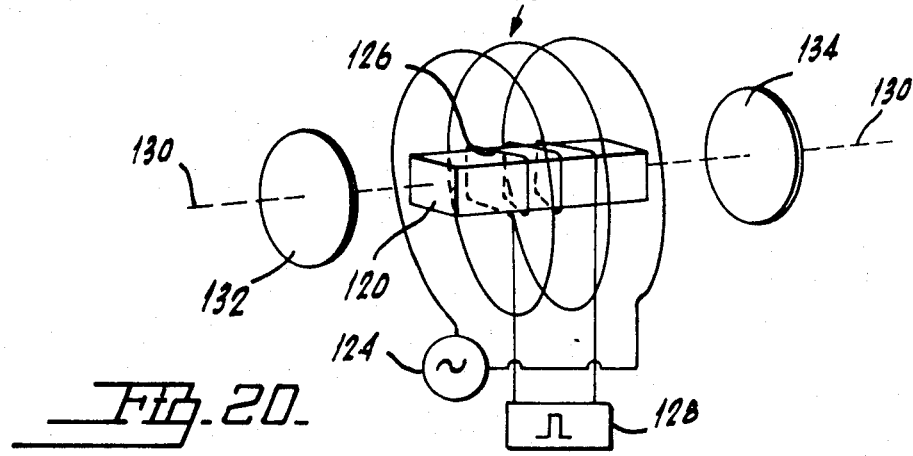
FIG. 20 is a schematic diagram of an embodiment of the invention employing magnetic material.

FIG. 20 illustrates an optical modulator operating on the principles just discussed. It includes a crystal of YIG 120 within a solenoid 122. The solenoid is driven by a source of alternating current 124 and the alternating magnetic field thereby created stabilizes the crystal 120 at a temperature close to, but below the Neel temperature $T_n$. Resistance coil 126 is wound in thermal contact with crystal 120. A current pulse may be applied to this coil by source 128 for momentarily heating the crystal to a temperature above $T_n$.

Light beam 130 passes through polarizer 132, crystal 120 and analyzer 134. The current pulse applied by source 128 manifests itself as a modulation in the amplitude of the alternating component of the light emerging from the analyzer 134 (and also in the mean intensity of the emergent light as averaged over several cycles of the alternating frequency applied to coil 122).

Figure 21:
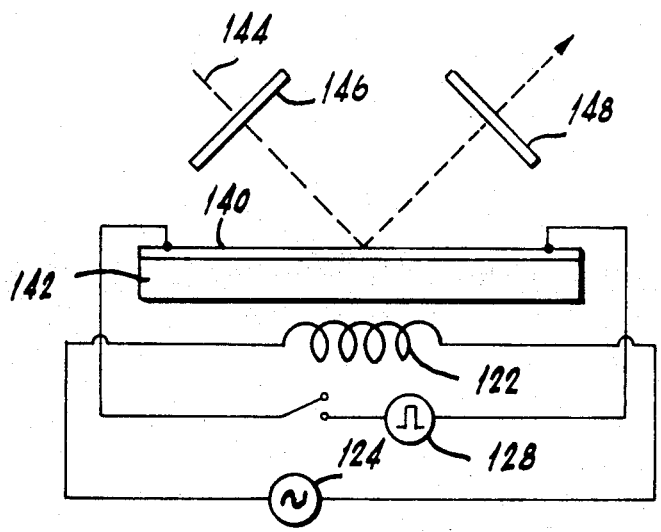
FIG. 21 is a schematic diagram of another embodiment of the invention employing magnetic material and in which light is reflected from the magnetic material.

FIG. 21 illustrates a magnetic device in which the light is reflected from rather than being transmitted through a magnetic element. The system includes a thin film 140 of magnetic material such as permalloy, on an insulating substrate 142. The source 124 and coil 122 are analogous to the similarly legended elements of FIG. 20. However, the heating by means of a signal is achieved by connecting the pulse source 128 directly to the permalloy film, as shown.

The light beam 144 passes through a polarizer 146 and is reflected from the surface of the permalloy film. The reflected beam passes through an analyzer 148.

In the operation of the system of FIG. 21, the alternating magnetic field produced by the coil 122 heats the permalloy film to a temperature just below its ferromagnetic-paramagnetic transition temperature just as in the system of FIG. 20. The polarizers 146 and 148 may be arranged substantially to extinguish the light at this temperature. A fast current pulse may then be applied by the source 128 to the permalloy film for momentarily heating the film and thus driving it into its paramagnetic phase. As a result, the polarization of the reflected light will change and a certain portion of this light will pass through the analyzer 148.

The principles of the present invention are also applicable to strain stabilized devices. Such devices may be formed of a material such as gadolinium molybdate, $Gd_2(MoO_4)_3$ which exhibits a hysteresis phenomenon in its stress-strain relationship as shown in FIG. 22. This loop becomes small as the temperature is raised and vanishes abruptly at a critical temperature $T_k$. For a constant applied stress, the mechanical loss rate has a temperature dependence such as shown in FIG. 23. Below the critical temperature $T_k$, gadolinium molybdate has domains that scatter light. Above the critical temperature $T_k$, these domains no longer exist and it is possible to propagate a beam of light through the crystal without attenuation due to scattering.

FIG. 24 illustrates an embodiment of the invention which operates on the principles discussed above. A crystal 150 of gadolinium molybdate is bonded at two of its opposite faces to two members 152 and 154. These members are mechanically or electromagnetically driven by a means for applying alternating stress illustrated schematically as block 156. The amplitude and frequency of the mechanical movement of the members 152 and 154 are chosen to raise the temperature of the crystal 150 to a temperature close to but slightly lower than its critical temperature $T_k$, in a manner analogous to that by which the TANDEL effect is achieved. A resistance heating coil 158 is in thermal contact with the crystal 150. Ideally, this heating coil contacts as large a portion as possible of the surface of the crystal but for clarity of illustration contact with only one surface of the crystal is shown. A current pulse applied to the heating coil source 128 may be employed further to heat the crystal to a temperature above $T_k$.

In the operation of the arrangement of FIG. 24, a light beam 159 is directed at one face of the crystal as shown. In the absence of the signal applied to the heating coil 158, the temperature of the crystal is slightly below the critical temperature $T_k$ and light scattering due to the domains in the crystal occurs. Light, therefore can not efficiently be propagated through the crystal. However, when a current pulse is applied to the heating coil by a source 128 to heat the crystal above the critical temperature $T_k$, the domains cease to exist and efficient propagation of light through the crystal occurs. At this temperature, the light beam 159 emerges from the crystal at 160.

What is claimed is:

1. An electro-optical system comprising, in combination;
   a material which exhibits an abrupt change in its optical properties when passing through a given critical temperature;
   means for heat biasing said material to an operating temperature on one side of, but close to, said critical temperature comprising means for applying an alternating signal to said material of an amplitude such that said operating temperature stabilizes at a value at which the heat lost by the material becomes equal to the heat added to the material;

means for directing light at said material; and means responsive to a signal for changing the temperature of said material to a value on the other side of said critical temperature.

2. A system as set forth in claim 1 wherein said material comprises a ferroelectric material; said critical temperature is the Curie temperature of said material, and said means for applying an alternating signal comprising means for TANDEL stabilizing said temperature, that is, means for switching said material back and forth between its polarization states.

3. A system as set forth in claim 1 wherein said material comprises a liquid crystal and said temperature comprises the order—disorder transition temperature of said liquid crystal.

4. A system as set forth in claim 1 wherein said means for directing light comprises means for directing a beam of linearly polarized light.

5. A system as set forth in claim 4 further including means for receiving the light passing through said material for affecting its intensity as a function of its polarization angle.

6. A system as set forth in claim 5 further including means for receiving the light passing through said material for deflecting said light through an angle dependent on its polarization angle.

7. A system as set forth in claim 1 wherein said material comprises a ferroelectric crystal and said temperature is one at which a change in crystal structure occurs.

8. A system as set forth in claim 1 wherein said material comprises one which exhibits a temperature sensitive, strain stress hysteresis loop and wherein said means for heat biasing comprises means for applying an alternating stress to said material.

9. A system as set forth in claim 8 wherein said means responsive to a signal comprises a heating coil in operative relationship with said material.

10. An electro-optical system comprising, in combination;

a ferroelectric material having a hysteresis loop and which has substantially different optical properties when above and below its Curie temperature, respectively;

means for heat biasing said material to a temperature on one side of, but close to, said Curie temperature comprising means for applying an alternating voltage to said material of an amplitude and frequency to switch the polarization of the material between the two polarization states defined by its hysteresis loop;

means for directing a beam of light at said material; and means responsive to a signal for changing the temperature of said material to a value on the other side of said Curie temperature.

11. A system as set forth in claim 10 wherein said material is one which exhibits an abrupt change in its index of refraction at its Curie temperature and wherein said material is of prism shape, said beam of light being directed at one of the nonparallel sides of said prism.

12. An electro-optical system comprising, in combination;

a material which exhibits a change in its optical properties when passing through a given temperature;

means for heat biasing said material to a temperature at or close to said given temperature comprising means for applying an alternating signal to said material of an amplitude such that said operating temperature stabilizes at a value at which the heat lost by the material becomes equal to the heat added to the material;

means for directing light at said material; and means other than said light, responsive to a signal for changing the temperature of said material to an extent sufficient to cause it to pass through said given temperature.

* * * * *

UNITED STATES PATENT OFFICE
CERTIFICATE OF CORRECTION

Patent No. 3,623,795                     Dated November 30, 1971

Inventor(s)   George W. Taylor and Arthur Miller

It is certified that error appears in the above-identified patent and that said Letters Patent are hereby corrected as shown below:

The following allowed claims were omitted from the patent through printing error.

13. A system as set forth in claim 12, wherein said material is transparent and is of a shape such that a beam of light directed substantially perpendicularly to one face strikes the opposite face at a relatively small angle to the normal to that other face, and said means responsive to a signal changes the index of refraction of said material between two states in one of which said material internally reflects the beam of light and in the other of which it refracts the beam of light.

14. A system as set forth in claim 12 wherein said material is a ferroelectric material.

15. A system as set forth in claim 12 wherein said material is one which exhibits a temperature-sensitive, strain-stress characteristic and said means for heat biasing comprises means for applying an alternating stress to said material.

Signed and sealed this 23rd day of May 1972.

(SEAL)
Attest:

EDWARD M. FLETCHER, JR.                    ROBERT GOTTSCHALK
Attesting Officer                          Commissioner of Patents